(12) United States Patent
Hosea et al.

(10) Patent No.: US 7,979,880 B2
(45) Date of Patent: Jul. 12, 2011

(54) METHOD AND SYSTEM FOR PROFILING ITV USERS AND FOR PROVIDING SELECTIVE CONTENT DELIVERY

(75) Inventors: Devin F. Hosea, Boston, MA (US); Richard S. Zimmerman, Belmont, MA (US); Arthur P. Rascon, Lexington, MA (US); Anthony Scott Oddo, Jamaica Plain, MA (US); Nathaniel Thurston, Somerville, MA (US)

(73) Assignee: Cox Communications, Inc., Atlanta, GA (US)

( * ) Notice: Subject to any disclaimer, the term of this patent is extended or adjusted under 35 U.S.C. 154(b) by 731 days.

(21) Appl. No.: 09/877,974

(22) Filed: Jun. 7, 2001

(65) Prior Publication Data

US 2002/0059094 A1 May 16, 2002

Related U.S. Application Data

(63) Continuation-in-part of application No. 09/558,755, filed on Apr. 21, 2000.

(51) Int. Cl.
*H04N 5/445* (2011.01)

(52) U.S. Cl. ........... 725/46; 725/44; 725/47; 709/219

(58) Field of Classification Search ........... 725/34–56, 725/106–117; 709/217–231
See application file for complete search history.

(56) References Cited

U.S. PATENT DOCUMENTS

| | | | |
|---|---|---|---|
| 5,223,924 A * | 6/1993 | Strubbe | 725/46 |
| 5,347,632 A | 9/1994 | Filepp et al. | 395/200 |
| 5,572,643 A | 11/1996 | Judson | 395/793 |
| 5,592,551 A | 1/1997 | Lett et al. | |
| 5,659,350 A * | 8/1997 | Hendricks et al. | 725/116 |
| 5,710,884 A | 1/1998 | Dedrick | |
| 5,740,252 A | 4/1998 | Minor et al. | |
| 5,740,549 A | 4/1998 | Reilly et al. | 705/14 |
| 5,754,774 A | 5/1998 | Bittinger et al. | 395/200.33 |
| 5,761,662 A | 6/1998 | Dasan | 707/10 |
| 5,794,210 A | 8/1998 | Goldhaber et al. | 705/14 |
| 5,798,785 A * | 8/1998 | Hendricks et al. | 725/46 |
| 5,801,747 A * | 9/1998 | Bedard | 725/46 |
| 5,812,784 A | 9/1998 | Watson et al. | 395/200.57 |
| 5,848,396 A * | 12/1998 | Gerace | 705/10 |
| 5,848,397 A | 12/1998 | Marsh et al. | |
| 5,913,040 A | 6/1999 | Rakavy et al. | 395/200.62 |
| 5,945,988 A * | 8/1999 | Williams et al. | 715/747 |

(Continued)

FOREIGN PATENT DOCUMENTS

WO   WO 00/33233   6/2000

(Continued)

OTHER PUBLICATIONS

"AdForce and Activate Deliver Next Generation Web Advertising," *Business Wire* (Nov. 8, 2000).

(Continued)

*Primary Examiner* — Annan Q Shang
(74) *Attorney, Agent, or Firm* — Merchant & Gould

(57) ABSTRACT

A method for profiling an iTV user. The method comprises gathering user-requested content information from iTV interactions, correlating content-associated profile information from a rating service with the user-requested content information, and developing a profile of the user based on the content-associated profile information correlated with the user-requested content information.

31 Claims, 8 Drawing Sheets

U.S. PATENT DOCUMENTS

| | | | | |
|---|---|---|---|---|
| 5,946,646 | A | | 8/1999 | Schena et al. .................. 702/177 |
| 5,948,061 | A | | 9/1999 | Merriman et al. |
| 5,959,623 | A | | 9/1999 | van Hoff et al. .............. 345/333 |
| 5,966,695 | A | * | 10/1999 | Melchione et al. ............. 705/10 |
| 5,974,398 | A | | 10/1999 | Hanson et al. |
| 6,005,597 | A | * | 12/1999 | Barrett et al. ................... 725/46 |
| 6,012,051 | A | | 1/2000 | Sammon, Jr. et al. |
| 6,014,638 | A | | 1/2000 | Burge et al. |
| 6,014,654 | A | | 1/2000 | Ariyoshi |
| 6,018,372 | A | | 1/2000 | Etheredge |
| 6,026,368 | A | | 2/2000 | Brown et al. .................... 705/14 |
| 6,041,311 | A | | 3/2000 | Chislenko et al. |
| 6,049,777 | A | | 4/2000 | Sheena et al. |
| 6,064,980 | A | | 5/2000 | Jacobi et al. |
| 6,078,866 | A | | 6/2000 | Buck et al. |
| 6,088,722 | A | * | 7/2000 | Herz et al. ..................... 709/217 |
| 6,092,049 | A | | 7/2000 | Chislenko et al. |
| 6,112,192 | A | | 8/2000 | Capek |
| 6,119,101 | A | | 9/2000 | Peckover |
| 6,134,532 | A | | 10/2000 | Lazarus et al. |
| 6,144,944 | A | | 11/2000 | Kurtzman, II et al. |
| 6,157,946 | A | | 12/2000 | Itakura et al. ................. 709/217 |
| 6,163,316 | A | * | 12/2000 | Killian .......................... 715/721 |
| 6,177,931 | B1 | * | 1/2001 | Alexander et al. .............. 725/52 |
| 6,208,975 | B1 | * | 3/2001 | Bull et al. ........................ 705/14 |
| 6,236,975 | B1 | | 5/2001 | Boe et al. |
| 6,236,978 | B1 | | 5/2001 | Tuzhilin |
| 6,243,760 | B1 | | 6/2001 | Armbruster et al. |
| 6,285,983 | B1 | | 9/2001 | Jenkins |
| 6,285,987 | B1 | | 9/2001 | Roth et al. |
| 6,295,061 | B1 | | 9/2001 | Park et al. |
| 6,298,348 | B1 | | 10/2001 | Eldering |
| 6,305,017 | B1 | | 10/2001 | Satterfield |
| 6,311,211 | B1 | | 10/2001 | Shaw et al. |
| 6,327,574 | B1 | | 12/2001 | Kramer et al. |
| 6,334,110 | B1 | | 12/2001 | Walter et al. |
| 6,366,298 | B1 | | 4/2002 | Haitsuka et al. |
| 6,385,590 | B1 | | 5/2002 | Levine |
| 6,427,063 | B1 | | 7/2002 | Cook et al. |
| 6,449,632 | B1 | * | 9/2002 | David et al. ................... 709/202 |
| 6,460,036 | B1 | * | 10/2002 | Herz .............................. 707/748 |
| 6,708,335 | B1 | * | 3/2004 | Ozer et al. ....................... 725/20 |
| 6,757,691 | B1 | | 6/2004 | Welsh et al. |
| 6,766,525 | B1 | * | 7/2004 | Lee et al. ......................... 725/46 |
| 6,769,009 | B1 | | 7/2004 | Reisman |
| 6,845,102 | B1 | | 1/2005 | Bendelac et al. |
| 6,882,977 | B1 | | 4/2005 | Miller |
| 6,882,990 | B1 | | 4/2005 | Barnhill et al. |
| 6,889,218 | B1 | | 5/2005 | Nassehi |
| 6,898,762 | B2 | * | 5/2005 | Ellis et al. ..................... 715/716 |
| 7,003,792 | B1 | * | 2/2006 | Yuen ............................... 725/46 |
| 7,013,478 | B1 | * | 3/2006 | Hendricks et al. ............. 725/46 |
| 7,020,643 | B2 | | 3/2006 | Mah et al. |
| 7,092,926 | B2 | | 8/2006 | Cerrato |
| 7,328,216 | B2 | | 2/2008 | Hofmann et al. |
| 7,496,553 | B2 | | 2/2009 | Cerrato |
| 2001/0011264 | A1 | | 8/2001 | Kawasaki |
| 2001/0049620 | A1 | | 12/2001 | Blasko |
| 2001/0056370 | A1 | | 12/2001 | Tafla |
| 2002/0004744 | A1 | | 1/2002 | Muyres et al. |
| 2002/0013729 | A1 | | 1/2002 | Kida |
| 2002/0129368 | A1 | | 9/2002 | Schlack et al. |
| 2005/0028208 | A1 | * | 2/2005 | Ellis et al. ....................... 725/58 |
| 2007/0011039 | A1 | | 1/2007 | Oddo |

FOREIGN PATENT DOCUMENTS

| | | |
|---|---|---|
| WO | WO/00/49801 | 8/2000 |
| WO | WO 01/20481 A2 | 3/2001 |
| WO | WO 02/082214 A2 | 10/2002 |
| WO | WO 02/102030 A2 | 12/2002 |

OTHER PUBLICATIONS

"CacheFlow Delivers cIQ Content-Smart Delivery Architecture," *Business Wire*, downloaded from Proquest http://proquest.umi.com/pqdweb?index=37&did=000000068530970&SrchMode=1&sid=5, 5 pages (Feb. 12, 2001).

European Search Report in Application No. 04758240.8 mailed Mar. 6, 2006.

Frook, J., "Web Add-On Helps Identify Site Visitors," *CommunicationsWeek*, downloaded from Proquest http://proquest.umi.com/pqdqeb?indez=9&did=000000010792847&sRCHmODE=1&SID=3&, 2 pages (Oct. 30, 1995).

Kannan, P. et al., "Marketing Information on the I-Way," *Communications of the ACM*, vol. 41, No. 3, pp. 35-43 (Mar. 1998).

U.S. Appl. No. 09/558,755, filed Apr. 21, 2000 entitled "Method and System for Web User Profiling and Selective Content Delivery".

Office Action mailed Sep. 11, 2002, in co-pending U.S. Appl. No. 09/558,755.

Office Action mailed Apr. 3, 2003, in co-pending U.S. Appl. No. 09/558,755.

Office Action mailed Nov. 12, 2003, in co-pending U.S. Appl. No. 09/558,755.

Advisory Action mailed Feb. 3, 2004, in co-pending U.S. Appl. No. 09/558,755.

Examiner's Answer to Appeal Brief mailed Nov. 3, 2005, in co-pending U.S. Appl. No. 09/558,755.

BPAI Decision mailed Aug. 29, 2006, in co-pending U.S. Appl. No. 09/558,755.

Office Action mailed Jan. 4, 2007, in co-pending U.S. Appl. No. 09/558,755.

Office Action mailed Jul. 9, 2007, in co-pending U.S. Appl. No. 09/558,755.

Advisory Action mailed Oct. 1, 2007, in co-pending U.S. Appl. No. 09/558,755.

Examiner's Answer to Appeal Brief mailed May 29, 2008, in co-pending U.S. Appl. No. 09/558,755.

BPAI Decision mailed May 28, 2009, in co-pending U.S. Appl. No. 09/558,755.

Office Action mailed Sep. 30, 2009, in co-pending U.S. Appl. No. 09/558,755.

Office Action mailed Apr. 14, 2010, in co-pending U.S. Appl. No. 09/558,755.

Advisory Action mailed Jun. 30, 2010, in co-pending U.S. Appl. No. 09/558,755.

Office Action mailed Sep. 29, 2010, in co-pending U.S. Appl. No. 09/558,755.

Office Action mailed Mar. 24, 2010, in pending U.S. Appl. No. 10/551,102.

Office Action mailed Sep. 28, 2010, in pending U.S. Appl. No. 10/551,102.

Harvey, Bill. "*Better Television audience Measurement through the research integration of set-top box data*". Phase Two, Copyright by ESOMAR®/ARF, published date unknown, 20 pages.

Bloedorn, Eric; Mani, Inderjeet. "*Using NLP for Machine Learning of User Profiles*". Artificial Intelligence Technical Center, the MITRE Corporation. 1998. 18 pages.

Good, Nathaniel; Schafer, J. Ben; Konstan, Joseph A.; Borchers, Al; Sarwar, Badrul; Herlocker, Jon; and Riedl, John. "*Combing Collaborative Filtering with Personal Agents for Better Recommendation*". GroupLens Research Project. Dept. of Computer Science and Engineering, University of Minnesota. 1999. 8 pages.

Balabanovic, Mark. "*An Adaptive Web Page Recommendation Service*". Department of Computer Science, Stanford University. 1997. 8 pages.

Pazzani, Michael J. "*Framework for Collaborative, Content-Based and Demographic Filtering*". Department of Information and Computer Science University of California, Irvine. 1999. 16 pages.

"AdForce and Activate Deliver Next Generation Web Advertising" Business Wire, Nov. 8, 2000.

Office Action mailed Mar. 16, 2011, in pending U.S. Appl. No. 09/558,755.

Office Action mailed Mar. 21, 2011, in pending U.S. Appl. No. 10/551,102.

* cited by examiner

| PN RECOMMENDS ||||| 31 |
|---|---|---|---|---|---|
| CHANNEL | 7:00 PM | 7:30 PM | 8:00 PM | 8:30 PM ||
| GOLF 23 | GOLF CHANNEL ACADEMY | GOLF CENTRAL | BEST OF GOLF TALK LIVE ||||
| CNNSI 25 | 2-MINUTE DRILL | MONDAY NIGHT COUNTDOWN ||||
| ESPN 26 | SPORTSCENTER || ESPNEWS |||
| TELEVISION LISTINGS ||||| 33 |
| CHANNEL | 7:00 PM | 7:30 PM | 8:00 PM | 8:30 PM ||
| CBS 4 | HOLLYWOOD SQUARES | ENTERTAINMENT TONIGHT | A CHARLIE BROWN CHRISTMAS | THE KING OF QUEENS ||
| ABC 5 | INSIDE EDITION | CHRONICLE | 20/20 DOWNTOWN |||
| FOX 6 | THE SIMPSONS | THE DREW CAREY SHOW | BOSTON PUBLIC |||
| NBC 7 | WHEEL OF FORTUNE | JEOPARDY! | TITANS |||
| WB 10 | FRIENDS | THE NANNY | 7TH HEAVEN |||
| UPN 11 | SEINFELD | FRASIER | MOESHA | THE PARKERS ||
| CLASSIC 29 | CLASSIC SPORTS REPOTERS || SPORTSCENTURY |||
| NESN 30 | SPORTS INNERVIEW | TIM McCARVER SHOW | COLLEGE BASKETBALL |||
| HN 34 | HEADLINE NEWS |||||
| HBO 44 | HOME ALONE(PG) || ANALYZE THIS(R) |||
| MAX 47 | A CHRISTMAS STORY(PG) || STRIKING DISTANCE(R) |||
| HIST 59 | HISTORY'S LOST AND FOUND | HISTORY IQ | HISTORY'S MYSTERIES |||
| SHOW 93 | WHAT DREAMS MAY COME(PG-13) || SISTER ACT2:BACK IN THE HABIT(PG) |||
| STARZ 95 | THICK AND THIN(R) || THE ASTRONAUT'S WIFE(R) |||

FIG. 3

METHOD AND SYSTEM FOR PROFILING ITV USERS AND FOR PROVIDING SELECTIVE CONTENT DELIVERY

RELATED APPLICATION

The present application is a continuation-in-part of application Ser. No. 09/558,755 filed on Apr. 21, 2000 and entitled "Method and System for Web User Profiling and Selective Content Delivery," which is incorporated herein by reference.

FIELD

The present invention relates generally to methods of profiling interactive television ("iTV") users, recommending content, and for delivering targeted content to users. The present invention can be applied to any content delivery medium including but not limited to TV, Internet, and wireless networks.

BACKGROUND

Advertising directed to iTV users (typically video advertisements and banner advertisements) is expected to grow rapidly along with the growth of iTV, the Internet, and E-commerce activity. Traditional methods of advertising have been found to be generally ineffective in drawing responses from users. Traditionally, television advertisements and web advertisements have not been targeted to particular users but are instead targeted based on the audience associated with the television show or Internet content site on which the advertisement will appear.

A more effective means of advertising is advertising targeted to particular users. For example, it is known to profile users by determining their demographics and interests, and to selectively send advertisements to only those users having particular profiles. Information on users can be obtained, e.g., from the users themselves through questionnaires. However, in these profiling methods, there is no assurance of user privacy or the accuracy of the profiling data. Also, there is no way of accurately matching the advertising to user profiles.

A need exists for a method and system for accurately and anonymously profiling users. A need also exists for a method and system for accurately matching users of given profiles to content to which they will likely be most receptive.

SUMMARY

One embodiment of the invention is a method for profiling an iTV user. In this embodiment, the method comprises gathering user-requested content information from iTV interactions, correlating content-associated profile information from a rating service with the user-requested content information, and developing a profile of the user based on the content-associated profile information correlated with the user-requested content information.

Another embodiment of the invention is a set-top box for profiling an iTV user. In this embodiment, the invention comprises a memory for storing a program and a processor operative with the program to gather user-requested content information from iTV interactions, correlate content-associated profile information from a rating service with the user-requested content information, and develop a profile of the user based on the content-associated profile information correlated with the user-requested content information.

Another embodiment of the invention is a computer readable medium comprising instructions for profiling an iTV user by performing the acts of gathering user-requested content information from iTV interactions, correlating content-associated profile information from a rating service with the user-requested content information, and developing a profile of the user based on the content-associated profile information correlated with the user-requested content information.

Yet another embodiment of the invention is a method for targeted advertising to an iTV user. In this embodiment, the method comprises receiving a plurality of advertisements, wherein each of the advertisements includes advertising information containing instructions with desired iTV user profiles for the advertisement, using a developed user profile along with the desired iTV user profiles from the plurality of advertisements to determine which of the plurality of advertisements to present to the iTV user as a targeted advertisement, and presenting the targeted advertisement to the iTV user.

Another embodiment of the invention is a method of profiling an iTV user. In this embodiment, the method comprises providing profiles on a plurality of iTV programs, monitoring which of said plurality of iTV programs the user accesses, and developing a profile of the user based on the profiles of the iTV programs accessed by the user.

Yet another embodiment of the invention is a set-top box for profiling an iTV user. In this embodiment, the set-top box comprises a memory for storing a program and a processor operative with the program to monitor which of a plurality of programs the user views and develop a profile of the user based on predetermined profiles of the programs viewed by the user.

Another embodiment of the invention is a computer for profiling an iTV user. In this embodiment, the computer comprises a memory for storing a program and a processor operative with the program to monitor which of a plurality of programs the user views and develop a profile of the user based on predetermined profiles of the television programs viewed by the user.

Yet another embodiment of the invention is a system for delivering selective advertising to an iTV user. In this embodiment, the system comprises a database containing profile data on a plurality of iTV programs, means for monitoring which of said plurality of iTV programs the user accesses, means for developing a profile of the user using profile data of the iTV programs accessed by the user, and means for matching the user with an advertisement based on the developed user profile.

Another embodiment of the invention is a system for delivering targeted advertisements to a client iTV of a user. In this embodiment, the system comprises a local server computer for providing iTV access to the user, a set-top box at the client iTV linked to the local server computer, the set-top box including means for monitoring which of a plurality of iTV programs the user accesses and means for developing a profile of the user based on predetermined profile data of iTV programs accessed by the user, a remote server computer linked to said local server computer and including means for providing an advertisement to a desired user based on the profile of the desired user and means for transmitting said advertisement to said local server computer for eventual transfer to the set-top box, and wherein the set-top box further contains means for matching the advertisement with the profile of the user.

Another embodiment of the invention is a computer readable medium comprising a program for profiling an iTV user by performing the acts of monitoring which of a plurality of iTV programs having predetermined profiles the user accesses and developing a profile of the user based on the profiles of the ITV programs accessed by the user.

Yet another embodiment of the invention comprises a computerized method of profiling iTV users and selectively delivering content to said users. This embodiment comprises providing profiles of a plurality of iTV programs, said profiles including demographic data of persons known to have viewed the iTV programs, monitoring which of said plurality of iTV programs each of said users visits, inferring a profile of each user based on the profiles of the iTV programs visited by the user, identifying a target group of said users who would be receptive to receiving certain content based on the profiles of the target group, and selectively delivering the content to users of the target group.

Another embodiment of the invention is a program module for a set-top box. The program module includes a sniffer for gathering user-requested content information from iTV interactions of a user, a profiler for correlating content-associated profile information from a rating service with the user-requested content information and for developing a profile of the user, and a matcher for recommending content to the user based on the profile of the user.

BRIEF DESCRIPTION OF THE DRAWINGS

For a fuller understanding of the nature and objects of the present invention, reference should be made to the following detailed description taken in connection with the accompanying drawings wherein:

FIG. 3 is a display screen shot of a personalized programming guide, which also displays a standard programming guide in the bottom portion.

DETAILED DESCRIPTION

A. General Overview

The present invention is directed to a method and system for profiling iTV users or clients based on their viewing habits, interactions with the iTV, and Internet surfing habits, and for selectively recommending and delivering content, such as advertising or recommended programs, to the users based on their profiles.

Figure 1:
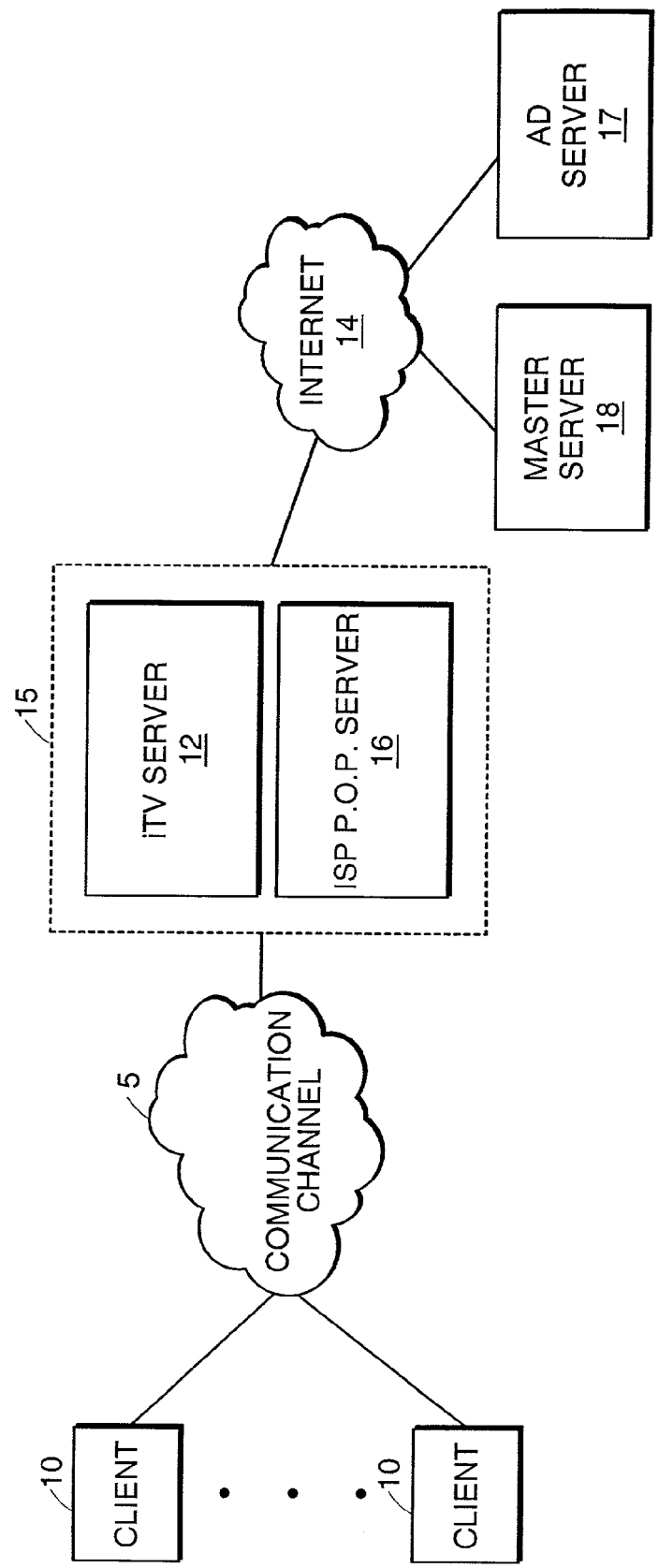
FIG. 1 is a block diagram illustrating of a representative network in which the inventive system may be implemented.

FIG. 1 illustrates a representative network in which the inventive system may be implemented in one embodiment. The network includes one or more client machines 10 operated by various individual users. The client machines 10 connect to an iTV/ISP server 15 via a communication channel 5, which may be a broadcast that is relayed to the clients 10 via a cable connection or satellite dish. The communication channel 5, in some embodiments, may include a back channel of communication for data going upstream from a client 10 to the iTV/ISP server 15. Such a back channel of communication, also represented by communication channel 5 in FIG. 1, may be a telephone line or cable modem, and such a back channel of communication allows two-way communication between the clients 10 and the iTV/ISP server 15. In another embodiment, which is a one-way communication embodiment, the iTV/ISP server 15 broadcasts information to the clients 10, but the clients 10 have no way of accessing or providing information back to the iTV/ISP server 15.

The iTV/ISP server 15 may be an iTV server 12, an ISP server 16, or a combination of the iTV server 12 and the ISP server 16. The iTV server 12 provides iTV content that may include programs, advertisements, and interactive content including the Internet. Such an iTV server may be provided by a cable operator, such as RCN. FIG. 1 also illustrates an ISP "point-of-presence" (POP), which includes an ISP POP Server 16, which may be linked to the client for providing access to the Internet. The ISP server 16 may be operated by the same entity as the iTV server 12, by separate entities, or by a joint effort between entities. In addition, the iTV server 12 may also function as the ISP server 16. In any event, the combined iTV/ISP server 15 represents the possibility that these two servers may be linked in some manner so that the client 10 may have access to interactive television programming and the Internet. It should be noted, however, that in some embodiments a client 10 may not have Internet access, and in such cases the iTV server 12 may be used without an ISP server 16. The Internet service provided through the ISP server 16 may be provided through a cable modem or over telephone lines.

In some embodiments, advertising may be hosted by an ad server 17 that is separate from the iTV server 12 that hosts the programming content. In such an embodiment, the iTV server 12 may be connected to the ad server 17 by a communication channel 14, which may be an Internet connection. The ad server 17, which may exist in typical iTV or television networks, allows advertisers to interact with the iTV server 12 to manage advertising over the television. In one embodiment of the invention, a master server 18 may be used to remotely manage the ad server 17. The master server 18 may be connected to the ad server 14 via communication channel 14, which may be an Internet connection. The master server 18 may be used by advertisers in an embodiment of the invention to determine which ads should be sent to which clients 10. In addition, in a television embodiment, the master server 18 communicates this information to the add server 17 via the communication channel 14, and the information is then forwarded to the iTV server 12 and ultimately the client 10. In an Internet embodiment, the master server 18 may communicate this advertising information to the ISP server 16, which may then communicate this information to the client 10. The master server 18 may also generate content recommendations for clients 10 that are relayed to the iTV server 12 via the ad server 17.

The client machine 10 may be an interactive television set with a set top box or, in other embodiments, a computer. The set top box may be made by Motorola and the operating system may be the OpenTV operating system. The television itself could be made by any manufacturer, including but not limited to Magnavox, Sony, and Toshiba. A representative interactive television set includes a set top box with a computer processing unit and memory, a remote control or keyboard, and a display unit (television set). The screen of the display unit is used to present programs, advertising, and other content to the user. A graphical user interface (GUI) on the display unit may also be available for the user to make programming selections, interact with programs, and access the Internet. The GUI is supported by the operating system and allows the user to use a point and click method of input, e.g., by moving a highlighted area on the display screen to a section representing a program at a particular time and pressing on the remote control buttons to perform a selection. Also, one or more "windows" may be opened up on the screen independently or concurrently as desired. One predominant GUI is the interactive television guide that allows a user to select a program to watch through the use of a remote control unit. Client machines 10 usually access web servers through the connection provided by a cable company, such as RCN.

If the interactive television includes Internet access, the client machine 10 typically may include a browser, which is a known software tool used for accessing the Internet. Representative browsers include Netscape Navigator and Microsoft Internet Explorer, although other browsers may be used within the scope of the invention. In such an embodiment, the client 10 may communicate with the ISP server 16. As is well known, the World Wide Web is the Internet's multimedia information retrieval system. In particular, it is a collection of servers of the Internet that use the Hypertext Transfer Protocol (HTTP), which provides users access to files (which can be in different formats such as text, graphics, images, sound, video, etc.) using, e.g., a standard page description language known as Hypertext Markup Language (HTML). HTML provides basic document formatting and allows developers to specify links to other servers and files. These links include "hyperlinks," which are text phrases or graphic objects that conceal the address of a site on the Web.

A user of a client machine 10 having an HTML-compatible browser (e.g., Netscape Navigator) can retrieve a Web page (namely, an HTML formatted document) of a Web site by specifying a link via the URL (e.g., www.yahoo.com/photography). Upon such specification, the client machine makes a transmission control protocol/Internet protocol (TCP/IP) request to the server identified in the link and receives the Web page in return.

Figure 2:
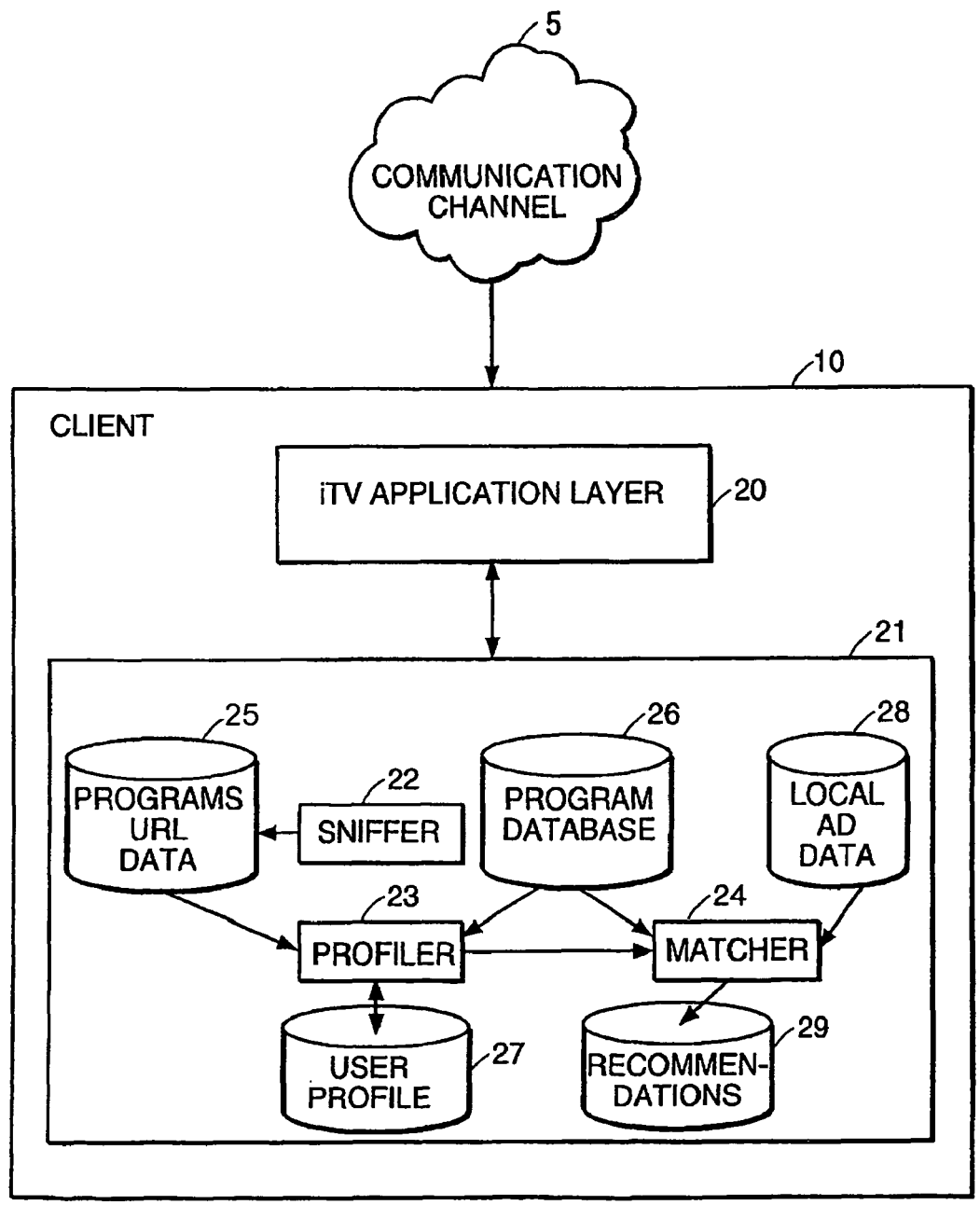
FIG. 2 is a block diagram illustrating the architecture of the client in one embodiment.

FIG. 2 illustrates one embodiment of a client machine 10 that may be used within the scope of the invention. In general, the embodiment of FIG. 2 may be used in an embodiment in which profiling of the user and selecting advertisement or program recommendations are carried out at the client level. The embodiment of FIG. 2 may be used in embodiments with either one-way or two-way communications between the client 10 and the iTV/ISP server 15. The client component 10 may generally be set up with instructions and databases to profile users based on their behavior on the iTV, store program, advertising, and other content, and match the content with the user's profile. The user's profile may be used for targeted advertising or for program recommendations to the user. FIG. 3, which will be discussed in greater detail below, depicts a display screen of one potential program recommendation embodiment. The client 10 may contain an iTV application layer 20, which may contain the standard instructions that allow the user to interact with the iTV, as well as a program module 21. The program module 21 may reside within the set top box of the client 10 or within a separate component at the client level.

B. Development of a User Profile

In the embodiment of FIG. 2, the program module 21 contains a data collection component that receives data at the set top box as the result of a user interaction with the client device. Typical user interactions include changing the channel, turning the client device on or off, viewing show information through the programming guide, responding to interactive surveys, surfing the web, or sending e-mails, although other types of interactions may also be monitored. Such user-requested content information may be used to build a profile. In one embodiment, the data collection component may be a sniffer 22 that monitors client interactions with the iTV. The sniffer 22 may extract program data as it comes into the set top box in order to monitor the user, and such information may be stored in an interaction database 25, referred to in FIG. 2 as programs and URL data. In other embodiments, the sniffer 22 may detect an outgoing Web page request from the client 10 and extract the actual URL request. In addition, the sniffer 22 may detect other interactions with the iTV client 10, including e-mails, or the sniffer 22 may monitor interacts and search for transactional data and keywords, such as those used in search engines on the World Wide Web. Such information may also be stored in the interaction database 25.

The profiler component 23 of the invention may then build a user profile 27 based on the information in the interaction database 25 and data in a local categorized program database 26. User profile information may contain, but is not limited to, demographic data (such as, e.g., the user's age, gender, income, and highest attained education level), psychographic data, which reflects the user's interests or content affinity (such as, e.g., sports, movies, music, comedy), geographic data, and transactional data. In an embodiment using program data collected from the sniffer 22, the local categorized program database 26 may contain demographic information on some or all of the television programs available from entities, such as AC Nielsen, that profile television programs using panels of viewers having known demographic characteristics. In other words, content-associated profile information for various programs may be available from a rating service. Program classification, URL classification, and profile data may be obtained from any third party vendors, such as but not limited to Neilsen NetRatings. In other embodiments, this data may be generated by the system of the invention after profiles are developed as described below. By adding a number of users of known demographics, the system could be configured to generate the program profile data. Furthermore, the overall demographics generated for the other anonymous users in the system could be used to fill out gaps in the program database, i.e., for programs having no classification data.

The client profiler 23 extracts from the program database 26 a set of demographic data associated with a particular television program request made by the user, which may be stored in the interaction database 25. The profiler 23 also extracts from the program database 26 content affinity or psychographic data associated with a program request made by the user. Such content affinity and psychographic data may come from a categorized listing of television programs that translate a program identifier into content preferences. The information in the program database 26 may be downloaded from the iTV server 12 to the set top box or client 10 periodically depending on the amount of memory available at the set top box. For set top boxes with very little memory, each hour a program database containing only the data for the programs shown that hour would be sent fro the iTV server 12 to the set top box or client 10. It should also be noted that the program database 26 may contain, in some embodiments, profile information and content affinity information for URL addresses or other client interaction data. Such URL information may include demographic or psychographic data that has been compiled by an outside source or given URLs, and such URL information may be gathered in the same manner as program data by the sniffer 22. In addition, the URL information may be used by the profiler 23 in the manner described above and in more detail below.

Next, an existing user profile may be accessed from a user profile database 27. The demographic and content affinity data for the program request or URL request made by the user and the user profile are combined to create an updated inferred user profile using a hybrid averaging algorithm. One example of such an algorithm is an algorithm that provides a weighted average of the existing user profile data and the data gathered in the current Web browsing session. For example, the new user profile data equals the existing user profile data multiplied by the number of prior user sessions plus the new user profile data gathered in the current session, all divided by the sum of the number of prior sessions plus one. This is represented in the following equation:

new user profile=(existing user profile×number of prior sessions+new user profile)/(number of prior sessions+1).

If a user is new and no user profile exists, a profile may be created based on the zip code corresponding to the physical location of the client 10. Zip Code data can also be used to supplement the demographic data supplied by a demographic information provider, such as A C Nielsen. The demographic data supplied by A C Nielsen may be based on the average demographics of people viewing a particular program or, in the case of URLs, the demographic data may be based on the average demographics of the people viewing a particular URL. Other data services, such as Claritas, provide demographics that are based on cluster analysis of people by geographic area. Using both a content-based source and a geographic-based source of demographics may lead to greater accuracy in profiling.

As previously discussed, television program profiles or URL profiles available from, e.g., A C Neilsen, are stored in the local categorized program database 26. These program profiles are classified along multiple psychographic and demographic categories. Throughout this specification, the term "content-associated profile information" will be used to refer to psychographic and demographic information, or to psychographic or demographic information. As examples of possible types of content-associated profile information that may be used, the following demographic and psychographic categories can be used:

Demographic Categories
Gender:
Male
Female
Age:
0-11
12-17
18-20
21-24
25-34
35-49
50-54
55-64
65-99
Income:
0-24,999
25,000-49,999
50,000-74,999
75,000-99,999
100,000-149,000
150,000 and up
Education:
Some High School
High School Graduate
Some College
Associates Degree
Bachelor's Degree
Post Graduate
Occupation:
Administrative or Clerical
Craftsman
Educators
Executive
Laborer
Homemaker
Military
Professional
Sales
Service
Student
Technical
Self-employed
Retired
Race:
Hispanic
Non-Hispanic
African American
Caucasian
Asian
Native American
Psychographic Categories
Entertainment:
Movies/Film
Theater
TV/Video
Drama
Mystery
Action
Family
Cartoons
Sci-Fi
Comedy
History
Science
Soap Opera
Game Shows
Music
Pop
Rock
Heavy Metal
Jazz
Classical
Opera
Rap/Hip Hop
R+B
Blues
Country
Dance
Games
Toys
Travel:
Air
Car Rental Lodging
Reservations
Maps
Finance/Investments:
Banking
Brokers
Quotes
Insurance
Mortgage
Sports:
Auto Racing
Baseball
Basketball
Fantasy Sports
Football
Hockey
Soccer
Golf
Tennis
Recreation & Hobbies:
Cycling
Golf
Hiking
Sailing
Snow Sports
Surfing
Tennis
Home & Garden
Pets
Genealogy
Photography
Games
Toys
Auto:
Trucks
SUV
Sports car
News and Information:
Magazines
Weather
Politics:
Democrat
Republican
E-shopping:
Groceries
Furniture
Auctions
Cards/Gifts
Apparel
Books
Music
TV/Video
Software
E-purchasing
Computers
Software
Science
Employment
Education
Health & Fitness
Medical
Pharmacy
Dating/Single
Advice
Beauty
Weddings
Maternity
Spirituality/Religion
Astrology
Discount
Luxury
Child
Teens
College Age
Over 18
Spanish Language For each viewing of a program having a stored profile, the program profile may be averaged or combined into the user's profile from the user profile database 27 as previously discussed. In other embodiments, the user's profile is updated with program profile information when a program is viewed for a certain period of time, such as 20 minutes or more. Similarly, for each visit to a Web site having a stored profile, the profile for that Web site is averaged or combined into the user's profile as previously discussed. The profiles include a rating in each category that reflects the interest in the category of persons who access the television program or Web site.

Each rating is accompanied by a confidence measure, which is an estimate of the accuracy of the rating. The confidence number is determined by analyzing the program or Web site and rating it on the type and specificity of content, with narrower and more singular content providing a higher confidence number. When the confidence measure in a particular category is below a predetermined threshold, information from other user profiles may be used to provide a more accurate rating in a process referred to as "profile completion."

An example of a user's profile is shown below. The first number in each category indicates the rating for that category. The ratings number is a percentage of a maximum rating, representing the degree of the user's affinity to the category. In the example below, the ratings number ranges from 0 to 100 with higher numbers indicating greater affinity. The second number in each category (in parenthesis) represents the confidence level in the rating for that category.

| | | | User Profile | | | | | |
|---|---|---|---|---|---|---|---|---|
| User ID | Sports | Finance | Movies | Music | TV | ... | Health | Gardening |
| 1 | 10.0 (.75) | 25.0 (.15) | 0.0 (1.00) | 0.0 (.28) | 0.0 (1.00) | ... | 50.0 (.77) | 85.0 (.82) |

Suppose the confidence threshold is defined to be 0.50 such that confidence is insufficient in any rating that has a confidence measure less than 0.50. For the user profile in the example table shown above, there is insufficient confidence in the ratings for the finance and music categories. In this situation, the system examines profiles of users with similar profiles to improve the accuracy of the ratings in those categories with low confidence measures.

A clustering algorithm can be used to find profiles that are similar to the profile of the current user. In judging the similarity between profiles, the confidence measures are ignored and the profiles are treated as n dimensional ratings vectors. A simple clustering algorithm is used based on the distance between vectors wherein all users whose profiles are within a certain distance of the subject user profile are collected. Then, the weighted average of all of the profiles in the collection is calculated to get an ideal profile for comparing to the subject user profile. If the ideal profile has a rating for the category in question that has an acceptable confidence measure, then this rating (and the accompanying confidence measure) replaces the corresponding rating in the subject user profile. In this way, part of the user profile that have low confidence ratings are "completed" or "filled-in." An example is shown below.

| 'Completed' User Profile | | | | | | | |
|---|---|---|---|---|---|---|---|
| User ID | Sports | Finance | Movies | Music | TV | ... | Health | Gardening |
| 1 | 10.0 (.75) | 21.1 (.62) | 0.0 (1.00) | 9.4 (.84) | 0.0 (1.00) | ... | 50.0 (.77) | 85.0 (.82) |

| Group similar profiles to generate an ideal profile to be used to complete the user's profile | |
|---|---|
| User ID | Profile |
| 1 | 10.0 (.89), 21.0 (.75), 0.0 (1.00), 17.0 (.74), 0.0 (1.00), ..., 52.0 (.64), 95.0 (.90) |
| 2 | 12.0 (.77), 5.0 (.15), 0.0 (1.00), 12.0 (.85), 0.0 (1.00), ..., 40.0 (.84), 90.0 (.75) |
| 3 | 11.0 (.81), 20.0 (.77), 0.0 (1.00), 0.0 (1.00), 0.0 (1.00), ..., 75.0 (.77), 81.0 (.73) |
| 4 | 10.0 (.56), 25.0 (.68), 4.0 (.27), 11.0 (.77), 0.0 (1.00), ..., 55.0 (.80), 85.0 (.85) |
| 5 | 12.0 (.75), 22.0 (.77), 0.0 (1.00), 10.0 (.83), 2.0 (.30), ..., 60.0 (.41), 80.0 (.45) |
| Ideal profile | 11.0 (.76), 21.1 (.62), 0.9 (.85), 9.4 (.84), 0.5 (.86), ..., 55.8 (.69), 87.1 (.74) |

In the example above, the ideal profile is calculated in the following manner. The rating for each category in the ideal profile is calculated by multiplying the rating times the confidence measure for each user. These products are then added across users in each category. This sum is then divided by the sum of the confidence measures added across users in the category. In mathematical terms, $R_{ideal,j} = \Sigma R_{i,j} C_{i,j} / \Sigma C_{i,j}$, where $R_{ideal,j}$ is the rating for the ideal profile in category j, $R_{i,j}$ is the rating in category j for user i, $C_{ij}$ is the confidence measure in category j for user i and the sum is taken over i as i ranges from 1 to n, which is 5 in this example. The confidence measure for each category in the ideal profile is calculated by taking the average of the confidence measure across users in the same category, $C_{ideal,j} = \Sigma C_{ji}/n$, where $C_{ideal,j}$ is the confidence measure for category j in the ideal profile, $C_{ij}$ is the confidence measure in category j for user i, and the sum is taken over i as i ranges from 1 to n, which is 5 in this example.

The ideal profile is used to complete the subject user profile. In the example described above, there was insufficient confidence in the ratings for the user in the finance and music categories. Users having similar profile ratings to the user were found to have a finance category rating of 21.1 with a confidence measure of 0.62. Since the confidence threshold was defined to be 0.50, it is possible to use the ideal profile finance rating of 21.1 (0.62) to replace the user's finance category rating of 25 (0.15). Similarly, the music category rating for similar user profiles was found to have a rating of 9.4 with a confidence measure of 0.84. This is greater than the threshold and is used to complete the subject user profile. The music category computation illustrates how the system is able to advantageously infer that the user may have an interest in the category despite the fact that he or she has not visited any ITV programs related to that category. The completed subject user profile now appears as follows:

In order to protect the privacy of users, the system may not keep data on which programs have been viewed or which Web sites have been visited by users for any long term period. Once data in the interaction database 25 has been used for updating a user profile, it is erased. Thereafter, it may not be possible to match users with particular programs viewed or Web sites visited.

Figure 4:
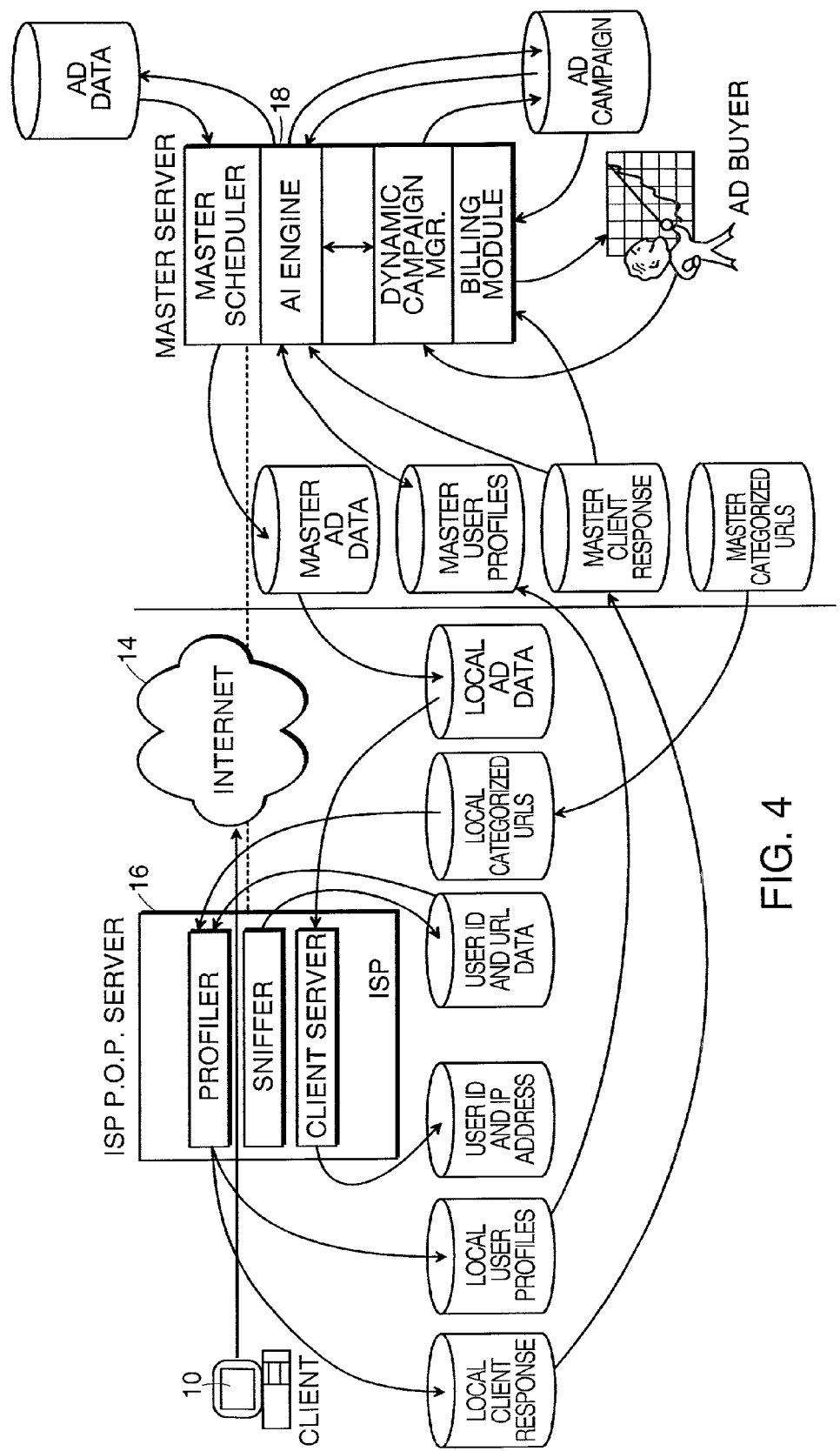
FIG. 4 is a block diagram illustrating the ITV or ISP server in an embodiment of the invention using two-way communication.
Figure 4A:
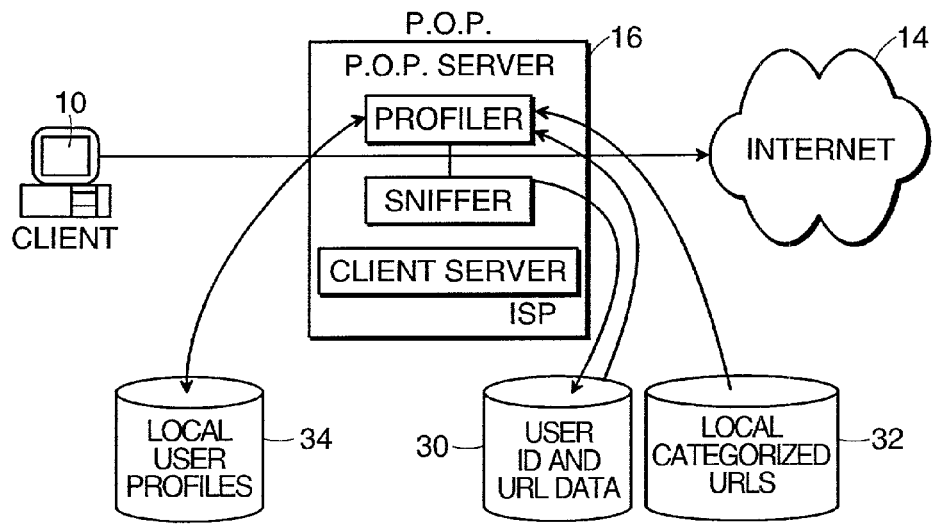
FIG. 4a is a block diagram illustrating the client profiling component for the embodiment of FIG. 4.

FIGS. 4 and 4a depict an embodiment of the invention that may be used where two-way communications between the client 10 and the iTV/ISP server 15 are possible. In the embodiment of FIGS. 4 and 4a, the sniffer and profiler exist on the server level at the iTV/ISP server 15, which, for simplification, is depicted as the ISP P.O.P. server 16 in FIGS. 4 and 4a. Referring to FIG. 4a, the data collection component in this embodiment is the sniffer, which resides in the ISP server 16. This sniffer may function in the same manner as described above in connection with FIG. 2, and may generally detect and store the user's program or URL requests if such requests pass through the ISP server 16. Such information may be stored in the user ID and URL database 30 of FIG. 4a. Because multiple clients 10 may be connected to the server 16 in this embodiment, the user's IP address or iTV address may be stored in the database 30. Because IP addresses are typically assigned dynamically, they are not necessarily the same every time a client logs into the ISP. To correlate an IP address with the associated client 10, the data collection component queries an IP address to anonymous user ID (AID) cross-reference table stored in another database at the ISP server 16. It then stores the User ID and URL/program information in the database 30.

The profiler component of FIG. 4a also works in a similar manner to that of the profiler 23 of FIG. 2. The profiler of FIG. 4a gathers a user's ID and URL or program data from the database 30 and develops a user profile using the localized categorized data in database 32, which may contain demographic and/or psychographic data for URLs and/or programs similar to that of program database 26 of FIG. 2. The user's profile may be generated in a similar manner to that described above, and the user's profile along with ID may be stored in the local user profile database 34 in the ISP server 16.

It should be noted that other embodiments may also be used when two-way communications are possible. In one such embodiment, the sniffer 22 and profiler 23 may function at the client level as in FIG. 2, and the user profile may be periodically sent back to the user profile database 34 on the server level (iTV server 12 or ISP server 16). The server level may then contain the profiles of all users that receive content from that server. In still other embodiments, the sniffer 22 and profiler 23 may exist at both the client level and at the server level. In one embodiment, the sniffer 22 and profiler 23 at the client 10 may develop a profile for television programs, while a sniffer and profiler at the server level may develop profiles based on URL requests, e-mails, or other information. In such an embodiment, the profiles at the client level and server level may be kept separate or may be combined into a single profile.

C. Recommendations and Targeted Advertising

In accordance with one embodiment of the invention, the system may selectively deliver content, e.g., advertisements, program recommendations, or the like, to users based on the profiles inferred in the manner described above. A personalized agent, or matcher, may make recommendations of content, such as programs, to a user based on the user's profile and history or based on other users' profiles or histories. In one embodiment, the iTV server 12 broadcasts information to each of the clients 10 connected to that service, and the content, which may include programs, may be stored in the program database 26 or in the local ad database 28. In general, the client 10 uses the profile stored in the profile database 27 to filter out content being sent from the iTV server 12 and to recommend or retrieve content that appears to be suited to the user. A variety of information may be sent from the iTV server 12 to the clients 10, including programs and advertisements.

In one embodiment, the personalization agent can generate program recommendations based on the past viewing behavior of the user. In addition to program recommendations, an interactive program guide that may appear on the user's display when using iTV may be automatically rearranged so that the channels or programs that are most commonly watched by the user appear at the top of the guide. Typical guides, on the other hand, currently list the channels in numerical order or start with the major networks followed by the remaining channels in numerical order. With current cable systems having in excess of 300 channels for users to choose from, it can be difficult for users to find information on the shows they are interested in if all channels are simply listed in numerical order. FIG. 3 illustrates one embodiment of a display that may be presented to a user to show recommendations, which may be generated by the personalization agent. The top portion 31 of the programming guide screen of FIG. 3 shows the recommended content that the user may be most likely to be interested in based on the user's profile. In FIG. 3, a number of sporting events are depicted in the 7:00 PM time slot, which may indicate that the user's profile shows that the user is interested in sports. This top portion 31 may also contain a list of the television stations most commonly watched by the user. The bottom portion 33 of the programming guide screen of FIG. 3 shows the standard programming guide in which the programs are listed for each time period in numeric order based on the number of the channel. In the depicted embodiment of FIG. 3, the recommended content and the standard programming guide (top portion 41 and bottom portion 42) may be included on a single screen, although in other embodiments only the top portion 41 may be displayed.

Referring again to FIG. 2, the matcher 24 or personalization agent that may be used to generate content recommendations is depicted on the client 10. The embodiment described below is for recommending television programs using iTV, although a similar procedure may be used to generate recommended Web sites or other content within the scope of the invention. In an iTV embodiment, recommendations may be generated whenever the user requests one through the iTV graphical user interface, typically a programming guide. The request is generally made through the use of an input device such as a remote control or a keyboard. Alternatively, recommendations may be automatically generated when the user selects the programming guide with the remote control. In some cases the guide automatically appears when the user turns on the television set. In either embodiment, the recommendation request may be sent to the set top box and the iTV client application layer 20 may forward the request to the matcher component 24 of the client 10.

The matcher component 24 may then query the profiler 23 or user profile database 27 to get the user's profile. In addition, the matcher component 24 may query the program database 26 to ascertain which programs are currently showing or are showing in the near future. The matcher 24 may then find the programs that best match the user's interests and return those programs to the application layer 20, which will send the recommendations to the display screen. The program database 26 may contain program information that is downloaded from the iTV server 12, as discussed above in connection with the profiler 23. Such program information may have associated demographic/psychographic information that may be used by the matcher 24 to determine which programs best match the user's interests based on the user's profile. Recommendations may, in one embodiment, be stored in a recommendations database 29, as shown in FIG. 2. It should be noted that certain networks or television shows may wish to advertise shows through the use of a recommendation agent. Such shows may be recommended to users based on the profiles of the users, and the networks or shows may therefore have a targeted method of advertising for television shows. In addition, Web sites may have a similar method of targeted advertising.

The sniffer 22, profiler 23, and matcher 24 may be used to target content for the user based on a variety of factors considered in building a user profile. Such an approach may provide for an accurate measure of the user's interests, and hence for accurate matching using the matcher 23. Novelty of certain behaviors of the user may factor into the profile of the user built using the method above. For instance, user behavior that is new from what the user has done in the past may be built into the user profile. As an example, a user may watch a boxing match after watching no sporting events for a long period of time, and this may be built into the user's profile. Interest in certain behaviors may be built into a user's profile through the use of the confidence measure. Interest could be measured by length of time spent at a URL address, length of time spent viewing a certain program or channel, or repeated visits to the same Web site or television channel. As such, the matcher 24 may use a wide variety of behavioral information of the user, and not a single behavior, such as purchases of books, to focus in providing content. In addition, the mode the user is in when surfing the Web or watching television may be considered. For instance, the confidence measure of interest in an activity may be low when the user is surfing the Web or television channels. In such cases, the amount of time spent on certain Web sites or channels may be comparatively small, and this may factor into the user's profile. Similarly, if a user shops frequently using such channels on television or Web sites, this may be factored into the user's profile so that such content may be recommended to the user.

Using the methods described above, the matcher 24 may be able to recommend content within specific categories for the user. For instance, the user's profile may be constructed to include levels of interest for various types of sporting activities. The iTV system could be set up to allow the user to request channels with sporting activities to view on television or Web sites with sporting activities, and the matcher 24 could find sporting activities that the user is more likely to enjoy based on that user's profile. Similarly, such a method could be used for to recommend specific shopping channels or sites to the user. As such, the user could be provided with program recommendations within a number of categories, including but not limited to sporting activities and shopping.

In systems where two-way communication is available between the client 10 and the iTV/ISP server, the above functions for the matcher 24 may be carried out at the server level instead of at the client-level. In one embodiment, recommendations for a given user may be generated based on the preferences of other users with viewing habits similar to that of the user. In such an embodiment, the user's profile may be sent to the iTV/ISP server 15 or the master server 18 upon a user's request for recommendations. The iTV/ISP server 15 or the master server 18 may contain a database of user profiles, and this database of user profiles may be used to determine which programs a user is likely to be interested in. Such a program may then be delivered to the client 10.

Another embodiment of the invention also allows advertisers to target advertisements based on the profiles of users. Among other possibilities, such targeted advertisements may be banner ads displayed when the user is using the Internet or television advertisements displayed when the user is viewing television. In general, the advertisers may be allowed to select a requested profile for users who will receive the advertisements, and the profiles of the users may be used to match advertising content to the user's profiles.

Figure 8:
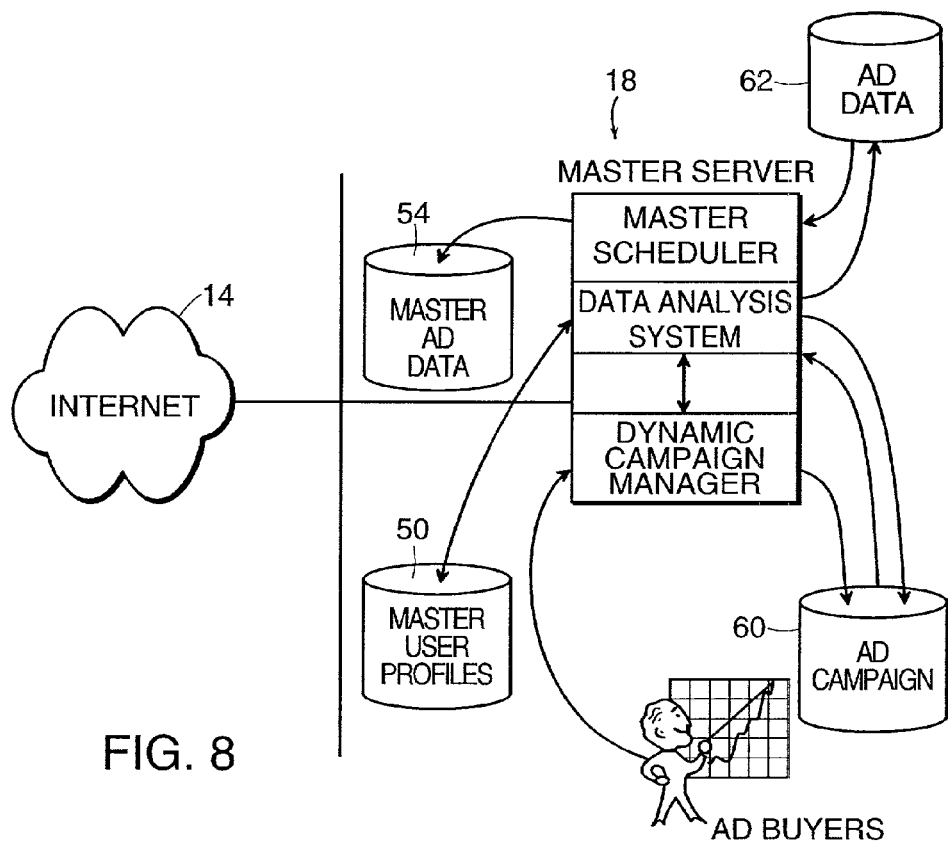
FIG. 8 is a block diagram illustrating the dynamic campaign manager of an embodiment of the invention.

In order to provided for targeted advertisements in this manner, a dynamic campaign manager component, as shown in FIG. 8, may reside on the master server 18. Such a master server 18 and dynamic campaign manager may provide a portal to the system for advertisers (i.e., ad buyers) to select a targeted audience for a particular advertising campaign. In choosing the target audience, the advertiser is given various options regarding the demographic and psychographic characteristics of the desired audience for the ad. The dynamic campaign manager component, which may be an interface program that allows an advertiser to select content, takes information entered by an advertiser, creates an advertisement profile, and stores this data in an ad campaign database 60. In an embodiment in which there is one-way communication between the iTV/ISP server 15 and the client 10, the desired profile from the ad campaign database 60 is sent along with the ad to the local ad database 28 (FIG. 2) of the client 10 via the ad server 17, which generally provides an interface for advertisers in traditional iTV systems.

Figure 6:
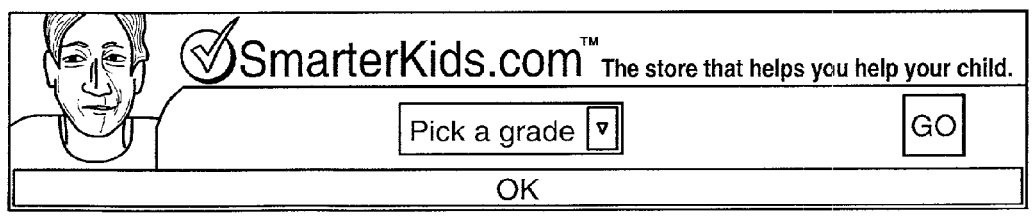
FIG. 6 is a screen shot of an exemplary pop-up advertisement in accordance with an embodiment of the invention.

In an embodiment where one-way communication between the client and the iTV/ISP server 15 is used, the master server 18 of FIG. 8 may have relatively few components. The information in the local ad database 28 is then used by the matcher component 24 of the client 10 to find the best ad for the user to view. The best ad for the user to view may be selected by the matcher component 24 in the manner described above in connection with providing content recommendations. In this embodiment, a large number of advertisements may be sent to the client 10, and then the matcher 24 may filter those advertisements so that the viewer is provided with the most relevant advertisements based on the user's profile. It should be noted that such an embodiment may also be used for banner advertisements presented when the user is connected to the Internet. For instance, the URLs of a number of banner advertisements may be delivered to the local ad database 28 of the client 10, and the matcher 24 may then select the most relevant banner advertisements based on the profile of the user. FIG. 6 is a screen shot 50 of a sample banner ad pop-up. The pop-up window may include a "close" button, which allows a user to dismiss the window if desired. The window size, position, and order in the window stack may be remotely configurable. If the user clicks on the banner or some link therein (i.e., clicks-through), that destination is brought up in a browser window, and the user is transferred to the site of interest. In such a manner, targeted advertisements may be presented to the user.

Figure 9:
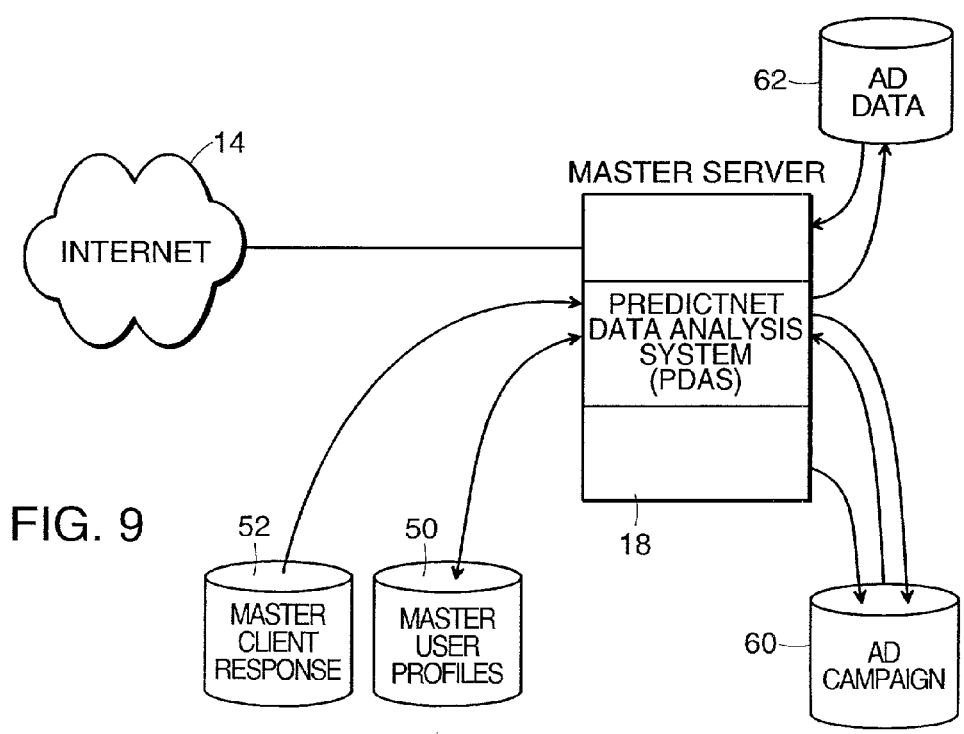
FIG. 9 is a block diagram illustrating the data analysis system component of an embodiment of the invention.

Targeted advertising may also be accomplished using other techniques. In an embodiment where there is two-way communication between the iTV/ISP server 15 and the clients 10, the advertising system may operate in a different manner, although it may continue to function as described above. In one embodiment, the profiles of a plurality of local users may be stored in a master user profile database 50 on the master server 18, as shown in FIGS. 8 and 9. This database 50 may be queried by the data analysis system to project the number of users of a particular profile that may be available to receive an ad. The data analysis system takes advertising profile data from the ad campaign database 60 and matches it to user profiles from the master user profile database 50. Such a master user profile database 50 may contain a number of user profiles. In addition, during the course of an advertising campaign, the data analysis system may take data from the master client response database 52 (FIG. 9), which includes client response information on content sent to the client 10, to refine the user profiles selection. The data analysis system may write the results of matches to the advertisement database 62. The master scheduler takes data from the advertisement database 62, resolves any conflicts, and writes the data to the master advertisement delivery database 54, which may be used to schedule delivery of targeted advertisements to various users.

D. Distributed Architecture Embodiment

Figure 5:
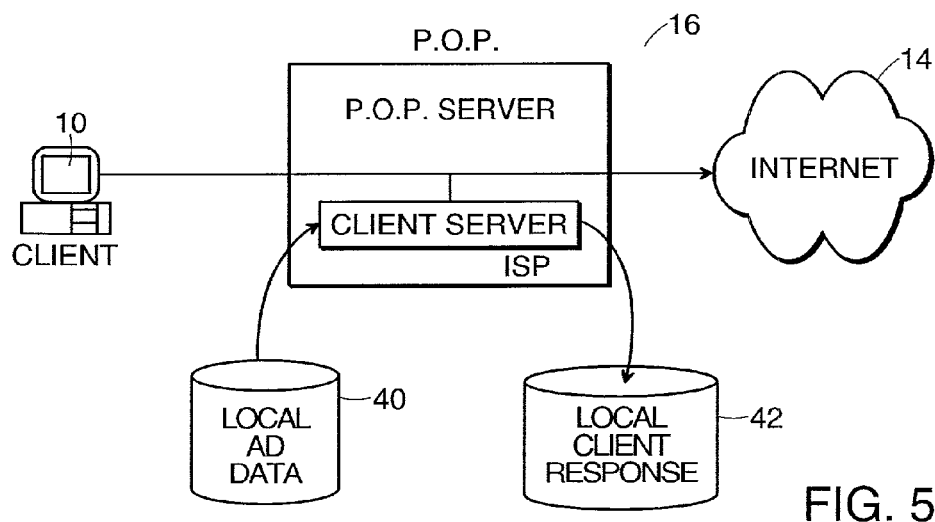
FIG. 5 is a block diagram illustrating the direct client communications component of one embodiment of the invention.

A direct client communications component may be used in some embodiments of the invention, and in particular in embodiments using two-way communication between the client 10 and the iTV/ISP server 15. Such a direct client communications component may provide a number of services, as described below. As illustrated in FIG. 5, a direct client communications component may selectively retrieve content in the form of URLs from a local advertisement database 40 on the ISP server 16, and send it to client machines 10. The content is displayed on the client machine 10 using the URL display component as described.

The direct client communications component associates a client's permanent anonymous user ID and the currently assigned IP address and stores the data in the IP address to an AID cross-reference table, which allows identification of a particular client in spite of a changing IP address. The direct client communications component also optionally communicates to the ISP server 16 the details of a given client's computer configuration (e.g., which multimedia plug-ins are installed, the bandwidth of the Internet connection, etc.). This information can be used by the system to help ensure that rich-media content is delivered only to those client machines 10 that have the ability to easily and quickly display such content. The direct client communications component may also communicate to the client machine 10 the availability of any new versions of URL display software and indicate how they can be downloaded. The URL display component can then initiate an automated download/install process for the software update if desired by the user.

The URL display component, which may reside on an individual client machine 10, may periodically connect to the direct client communications component and download a list of URLs (linked to content such as advertisements) to be displayed on the client machine 10. The URL display component then uses the URLs to retrieve the actual content pointed to by the URL, and displays the content on the client machine 10 display. The content may be displayed in a non-obtrusive manner, such as the pop-up window of FIG. 6. In this manner, targeted advertising using banner ads or the like may be provided in an additional manner to that described above. The URL display component may also record feedback information on the user's response to the delivered content. This data can include, e.g., how long the advertisement was displayed and whether there was a click-through by the user. This data is sent to the direct client communications component on the ISP server 16, which stores it in a local client response database 42, as seen in FIG. 5. This data can be used for billing advertisers and/or for advertising campaign result tracking as will be discussed below.

Since the URL display component may reside on the client machine 10, it may be desired to make limited resource demands on the client 10 (e.g., on the client machine memory, CPU time and monitor space, Internet bandwidth, etc.). Accordingly, the URL display component may monitor the Internet connection and only download the actual content data (pointed to by the URLs) when the connection is idle. Software updates may also be downloaded only when the connection is idle. In addition, the URL display component may monitor the client machine CPU usage, the unused real estate on the display, the currently active application and any other relevant parameters to ensure that the content placement (i.e., the pop-up advertisement) and timing is both effective and not intrusive or annoying to the user. The URL display component may also monitor the versioning of the files required for software updates and download only the software files that have changed.

Figure 7:
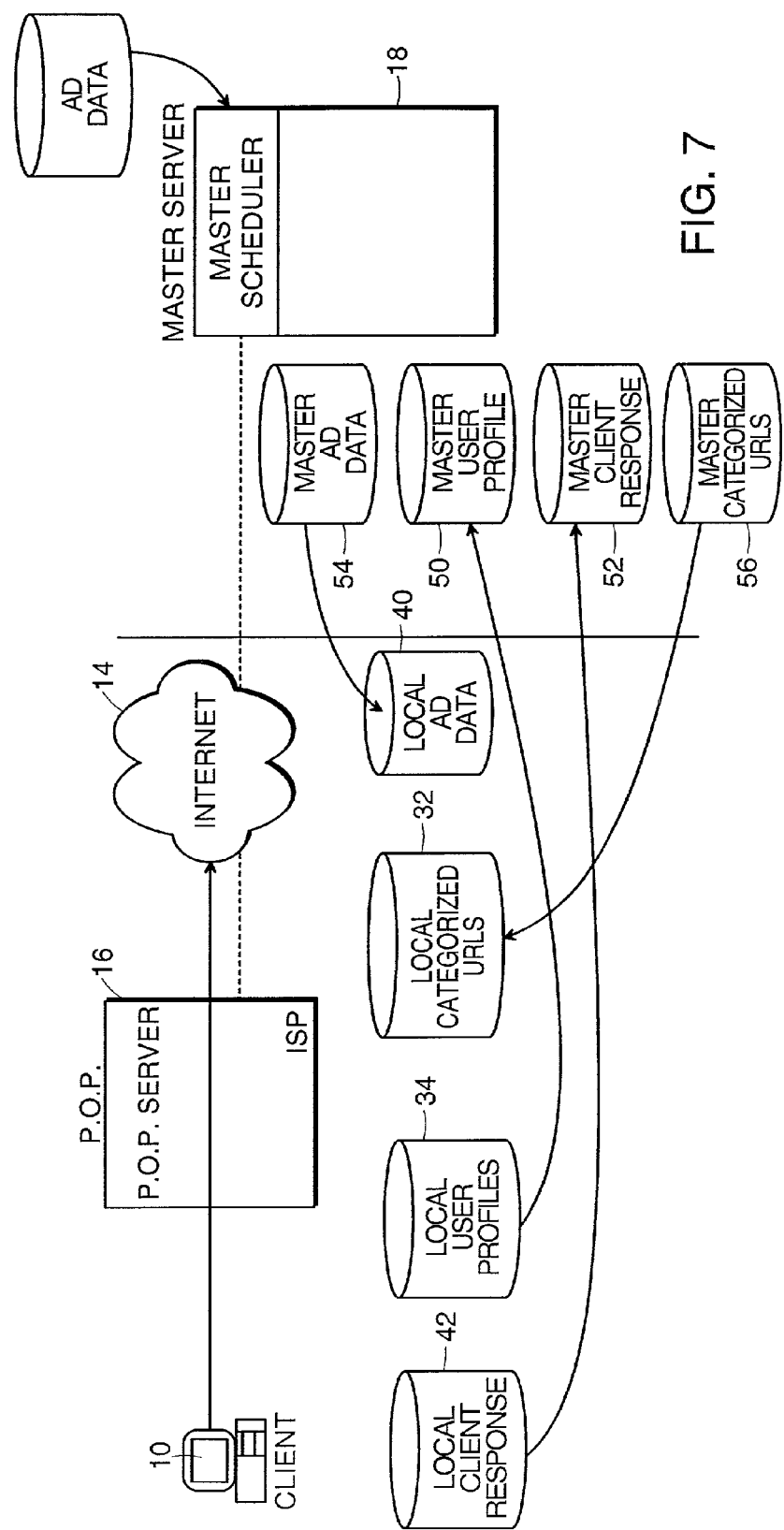
FIG. 7 is a block diagram illustrating the master server synchronization component of an embodiment of the invention.

The data collection, delivery and display components residing at the ISP server 16 and individual client machines 10 described above may be designed to operate "stand-alone," i.e., independently of and without interaction with the master server 18 for at least some period of time. The system, however, may synchronize data between the master server 18 and the ISP server 16 from time to time as illustrated in FIG. 7. A master server synchronization component residing at the master server 18 and at the POP server 16 periodically retrieves the local client profile database 34 and integrates the data into the master client profile database 50 located at the master server 18. It also retrieves the local client response database 42 and integrates the data into the master client response database 52. The master server synchronization component also parses through a master advertisement delivery database 54 looking for anonymous user IDs that correspond to the local POP and creates the local advertisement delivery database 40 on the ISP POP. It also replicates a master categorized URL database 56 on the local categorized URL database 32.

This distributed architecture greatly reduces the bandwidth requirements of the individual ISP POP server 16 as well as the master server 18. In addition, it significantly enhances the scalability of the overall system. Also, it increases the fault tolerance of the overall system. Furthermore, is allows for rapid deployment, easy debug and monitoring, resulting in a robust system.

E. Monitoring of Advertising Campaigns

In a one-way communication embodiment between the client 10 and the iTV/ISP server 15, an advertiser may be able to monitor the success of an ad campaign by being provided with an approximate number of users with the desired profile for the advertisement. In addition, traditional questionnaire methods may be used to determine the success of an ad campaign. Such methods may provide the advertiser with some degree of awareness as to the success of an ad campaign.

In other embodiments, such as those with two-way communication between the client 10 and the iTV/ISP server, an advertiser can monitor the success of a current ad campaign through the dynamic campaign manager shown in FIGS. 8 and 9. For example, for the use of banner ads using the Internet, the advertiser can monitor the number of times content has been delivered as well as the number of click-throughs on that content. In general, the advertiser may be given access to the master client response database 52 for an ad campaign to determine how many users have viewed advertisements. For embodiments with advertisements provided on television, a record of those ads viewed by each user may also be maintained in the master client response database 52 in a two-way communication embodiment. An advertiser may then determine the number of times a certain ad has been viewed by a single user and the number of times the ad has been viewed by all users using two-way communication systems of the invention.

The system may also be adaptive in that the advertiser can, if desired, change its marketing strategy (e.g., by adjusting the profile of the targeted audience) at various points in the campaign to optimize results. Thus, campaigns can be altered dynamically based on changing requirements from the advertiser or feedback provided by the system. Campaign management by an advertiser may be accomplished through a browser-based console through the master server 18. The advertiser can use it to define campaigns, provide content, and alter target groups. Feedback as to the success rate of an ad campaign that is in progress may also accessible using such a console.

Figure 10:
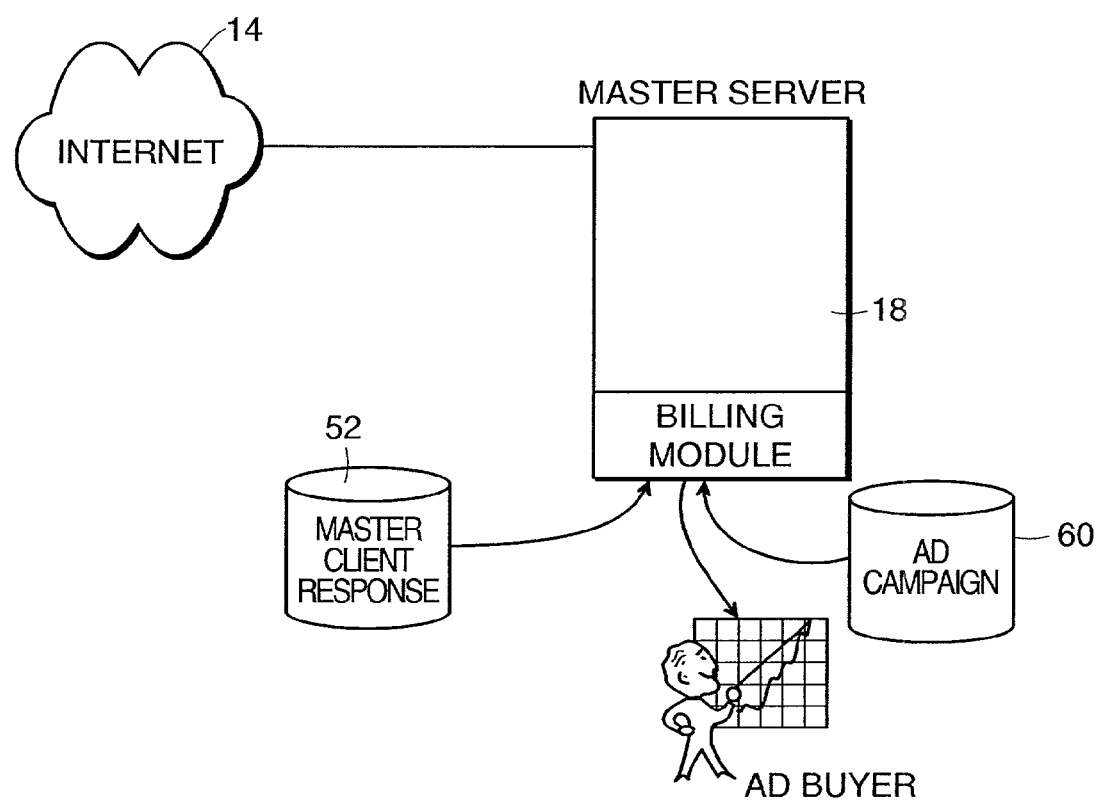
FIG. 10 is a block diagram illustrating the billing component of an embodiment of the invention.

FIG. 10 illustrates the billing component of one embodiment of the invention. Such an embodiment may be used in systems with two-way communication between the client 10 and the iTV/ISP server 15, and such an embodiment may be used for billing for television ads and banner ads for the Internet. The billing component may reside on the master server 18 and monitors the status of an advertising/content campaign, recognizes whether certain billing milestones have been met (e.g., whether an ad has been displayed a given number of times), and generates actual invoice information to be sent to advertisers. The billing component periodically queries the master client response database 52 to determine the current status of a particular advertising campaign. If predefined billing milestones have been reached, the billing component retrieves specific customer (i.e., advertiser) information from the advertisement campaign database 60 to generate formatted invoices for billing purposes.

Having described a number of embodiments of the present invention, it should be apparent that modifications can be made without departing from the spirit and scope of the invention. Accordingly, the drawings and above description are to be regarded as illustrative in nature and not in a restrictive or limiting sense, with the scope of the invention being indicated in the claims.

What is claimed is:
1. A method for profiling iTV users, comprising:
   gathering user-related profile data at a client component by monitoring interactions between an iTV user and an iTV to extract data received at the iTV, data transmitted by the user from the iTV and interactions between the user and the iTV;

storing the gathered user-related profile data in an interaction database at the client component for processing at the client component to generate content recommendations;

periodically retrieving the gathered user-related profile data in the interaction database;

building, at the client component, a user profile associated with the user of the iTV based on retrieving the gathered user-related profile data in the interaction database at the client component and data in a local categorized program database at the client component, wherein the user profile includes affinity and confidence measures for programs; and generating, at the client component, an interactive program guide having a listing of available programs rearranged to form a first portion and a second portion, the first portion being displayed in a priority position for initial review by the viewer, the first portion further presenting content recommendations filtered from the listings of the available programs based on the affinity and confidence measures for programs in the user profile, the order of the content recommendations reflecting a predicted interest of the user for the content recommendations based on a comparison of the affinity and confidence measures of the user profile associated with the user to the data retrieved from the local categorized program database and the second portion presenting only unfiltered listings of the available programs in numeric order based on the number of the channel.

2. The method of claim 1, wherein the gathering user-related profile data by monitoring interactions between an iTV user and an iTV includes gathering data associated with Internet navigation by the user using the iTV.

3. The method of claim 1, wherein the gathering user-related profile data further comprises identifying demographic information associated with the user.

4. The method of claim 1, wherein the gathering user-related profile data further comprises identifying psychographic information.

5. The method of claim 1, wherein the gathering user-related profile data by monitoring interactions between an iTV user and an iTV to extract data received at the iTV, data transmitted by the user from the iTV and interactions between the user and the iTV further comprises identifying a program watched by the user.

6. The method of claim 1, wherein the gathering user-related profile data by monitoring interactions between an iTV user and an iTV to extract data received at the iTV, data transmitted by the user from the iTV and interactions between the user and the iTV further comprises associating a plurality of programs with content-associated profile information of viewers of the program watched by the user.

7. The method of claim 1, wherein the building a user profile associated with the user of the iTV based on the gathered user-related profile data in the interaction database and data in a local categorized program database further comprises adjusting the user profile by examining profiles of users with similar profiles to improve the confidence measures of programs below a threshold.

8. The method of claim 1, further comprising receiving a plurality of advertisements selected using the user profile associated with the user of the iTV.

9. The method of claim 8, further comprising selecting one of the plurality of advertisements for presentation to the user via the iTV based on demographics associated with the user profile of the user.

10. The method of claim 1, wherein the building a user profile associated with the user of the iTV based on the gathered user-related profile data in the interaction database and data in a local categorized program database further comprises associating a plurality of URLs having content determined to match the user profile associated with the user of the iTV.

11. The method of claim 1, wherein the building a user profile associated with the user of the iTV based on the gathered user-related profile data in the interaction database and data in a local categorized program database further comprises building a user profile associated with the user of the iTV based on the gathered user-related profile data in the interaction database and data in a database developed by a television program ratings service and a web site ratings service.

12. A set-top box for profiling iTV users, comprising:
memory for providing an interaction database; and
a processor, coupled to the memory, the processor being configured to gather user-related profile data at the set-top box by monitoring interactions between an iTV user and an iTV to extract data received at the iTV, data transmitted by the user from the iTV and interactions between the user and the iTV, to store the gathered user-related profile data in the interaction database at the set-top box for processing at the set-top box to generate content recommendations, to periodically retrieve the gathered user-related profile data in the interaction database, to build, at the client component, a user profile associated with the user of the iTV based on retrieving the gathered user-related profile data in the interaction database at the set-top box and data in a local categorized program database at the set-top box, wherein the user profile includes affinity and confidence measures for programs and to generate, at the set-top box, an interactive program guide having a listing of available programs rearranged to form a first portion and a second portion, the first portion being displayed in a priority position for initial review by the viewer, the first portion further presenting content recommendations filtered from the listings of the available programs based on the affinity and confidence measures for programs in the user profile, the order of the content recommendations reflecting a predicted interest of the user for the content recommendations based on a comparison of the affinity and confidence measures of the user profile associated with the user to the data retrieved from the local categorized program database and the second portion presenting only unfiltered listings of the available programs in numeric order based on the number of the channel.

13. The method of claim 12, wherein the processor is further configured to gather user-related profile data by monitoring interactions between an iTV user and an iTV by collecting data associated with Internet navigation by the user using the iTV.

14. The method of claim 12, wherein the processor is further configured to gather demographic information to build the user profile associated with the user of the iTV.

15. The method of claim 12, wherein the processor is further configured to gather psychographic information to build the user profile associated with the user of the iTV.

16. The method of claim 12, wherein the processor is further configured to identify a program selected for viewing by the user of the iTV.

17. The method of claim 12, wherein the processor is further configured to associate a plurality of programs with content-associated profile information of viewers of the programs.

18. The method of claim 12, wherein the processor is further configured to adjust the user profile by examining profiles of users with similar profiles to improve the confidence measures of programs below a threshold.

19. The method of claim 12, wherein the processor is further configured to receive a plurality of advertisements selected using the user profile associated with the user of the iTV.

20. The method of claim 12, wherein the processor is further configured to associate a plurality of URLs having content determined to match the user profile associated with the user of the iTV.

21. The method of claim 12, wherein the processor is further configured to build a user profile associated with the user of the iTV based on the gathered user-related profile data in the interaction database and data in a database developed by a television program ratings service and a web site ratings service.

22. A computer readable medium including executable instructions which, when executed by a processor, provides profiling iTV users, by:
gathering user-related profile data at a client component by monitoring interactions between an iTV user and an iTV to extract data received at the iTV, data transmitted by the user from the iTV and interactions between the user and the iTV;
storing the gathered user-related profile data in an interaction database at the client component for processing at the client component to generate content recommendations;
periodically retrieving the gathered user-related profile data in the interaction database;
building, at the client component, a user profile associated with the user of the iTV based on retrieving the gathered user-related profile data in the interaction database at the client component and data in a local categorized program database at the client component, wherein the user profile includes affinity and confidence measures for programs; and
generating, at the client component, an interactive program guide having a listing of available programs rearranged to form a first portion and a second portion, the first portion being displayed in a priority position for initial review by the viewer, the first portion further presenting content recommendations filtered from the listings of the available programs based on the affinity and confidence measures for programs in the user profile, the order of the content recommendations reflecting a predicted interest of the user for the content recommendations based on a comparison of the affinity and confidence measures of the user profile associated with the user to the data retrieved from the local categorized program database and the second portion presenting only unfiltered listings of the available programs in numeric order based on the number of the channel.

23. The computer readable medium of claim 22, wherein the gathering user-related profile data by monitoring interactions between an iTV user and an iTV includes gathering data associated with Internet navigation by the user using the iTV.

24. The computer readable medium of claim 22, wherein the gathering user-related profile data further comprises identifying demographic information associated with the user.

25. The computer readable medium of claim 22, wherein the gathering user-related profile data further comprises identifying psychographic information.

26. The computer readable medium of claim 22, wherein the gathering user-related profile data by monitoring interactions between an iTV user and an iTV to extract data received at the iTV, data transmitted by the user from the iTV and interactions between the user and the iTV further comprises identifying a program watched by the user.

27. The computer readable medium of claim 22, wherein the gathering user-related profile data by monitoring interactions between an iTV user and an iTV to extract data received at the iTV, data transmitted by the user from the iTV and interactions between the user and the iTV further comprises associating a plurality of programs with content-associated profile information of viewers of the programs watched by the user.

28. The computer readable medium of claim 22, wherein the building a user profile associated with the user of the iTV based on the gathered user-related profile data in the interaction database and data in a local categorized program database further comprises adjusting the user profile by examining profiles of users with similar profiles to improve the confidence measures of programs below a threshold.

29. The computer readable medium of claim 22, further comprising receiving a plurality of advertisements selected using the user profile associated with the user of the iTV.

30. The computer readable medium of claim 22, wherein the building a user profile associated with the user of the iTV based on the gathered user-related profile data in the interaction database and data in a local categorized program database further comprises associating a plurality of URLs having content determined to match the profile associated with the user of the iTV.

31. The computer readable medium of claim 22, wherein the building a user profile associated with the user of the iTV based on the gathered user-related profile data in the interaction database and data in a local categorized program database further comprises building a user profile associated with the user of the iTV based on the gathered user-related profile data in the interaction database and data in a database developed by a television program ratings service and a web site ratings service.

* * * * *